United States Patent
Kiss et al.

(10) Patent No.: US 11,595,860 B2
(45) Date of Patent: **\*Feb. 28, 2023**

(54) INTELLIGENT BASEBAND OPERATING MODE SELECTION FOR 5G BASED DEVICE

(71) Applicant: Apple Inc., Cupertino, CA (US)

(72) Inventors: Krisztian Kiss, Hayward, CA (US); Lakshmi N. Kavuri, San Jose, CA (US); Srinivasan Nimmala, San Jose, CA (US); Utkarsh Kumar, Fremont, CA (US); Viswanath Nagarajan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/196,711

(22) Filed: Mar. 9, 2021

(65) Prior Publication Data

US 2021/0195472 A1    Jun. 24, 2021

Related U.S. Application Data

(63) Continuation of application No. 16/400,571, filed on May 1, 2019, now Pat. No. 10,979,939.

(Continued)

(51) Int. Cl.
*H04W 36/00* (2009.01)
*H04W 36/02* (2009.01)
(Continued)

(52) U.S. Cl.
CPC ..... *H04W 36/0022* (2013.01); *H04W 36/023* (2013.01); *H04W 36/03* (2018.08);
(Continued)

(58) Field of Classification Search
CPC .......... H04W 36/0022; H04W 36/023; H04W 60/005; H04W 36/03; H04W 36/06;
(Continued)

(56) References Cited

U.S. PATENT DOCUMENTS 8,620,337 B2   12/2013   Meredith
9,351,209 B2   5/2016    Etemad
(Continued)

FOREIGN PATENT DOCUMENTS

CN   104768236 A   7/2015
CN   107548565 A   1/2018
(Continued)

OTHER PUBLICATIONS

First Office Action for CN Patent Application No. 201910386525.6; dated Sep. 8, 2021.
(Continued)

*Primary Examiner* — Dady Chery
(74) *Attorney, Agent, or Firm* — Kowert, Hood, Munyon, Rankin & Goetzel, P.C.

(57) ABSTRACT

An accessory device may dynamically determine to transition a cellular connection between mobile-initiated communication only (MICO) mode and non-MICO mode based on a variety of factors. The accessory device may be configured to communicate through a non-cellular network in addition to the cellular network. The accessory device may transition from MICO to non-MICO mode based on one or more of: loss of the non-cellular connection; location of the accessory device; a call, data, or SMS request failure over the non-cellular network; or other factors.

20 Claims, 10 Drawing Sheets

Related U.S. Application Data

(60) Provisional application No. 62/670,531, filed on May 11, 2018.

(51) Int. Cl.
  *H04W 60/00* (2009.01)
  *H04W 36/06* (2009.01)
  *H04W 36/30* (2009.01)

(52) U.S. Cl.
  CPC ......... *H04W 36/06* (2013.01); *H04W 36/305* (2018.08); *H04W 60/005* (2013.01)

(58) Field of Classification Search
  CPC ... H04W 36/305; H04W 8/005; H04W 88/04; H04W 88/06
  See application file for complete search history.

(56) References Cited

U.S. PATENT DOCUMENTS

| | | |
|---|---|---|
| 10,172,009 B1 | 1/2019 | Altay |
| 2016/0057723 A1 | 2/2016 | Horn |
| 2016/0262094 A1 | 9/2016 | Khay-Ibbat et al. |
| 2017/0265061 A1 | 9/2017 | Sherman et al. |
| 2018/0227872 A1* | 8/2018 | Li ............ H04W 8/02 |
| 2018/0270896 A1 | 9/2018 | Faccin |
| 2019/0053147 A1 | 2/2019 | Qiao |
| 2019/0069194 A1 | 2/2019 | Jun |
| 2019/0075511 A1 | 3/2019 | Ryu |
| 2019/0090175 A1 | 3/2019 | Mestanov |

FOREIGN PATENT DOCUMENTS

| | | |
|---|---|---|
| WO | WO2018008980 A1 | 1/2018 |
| WO | WO2018204191 A1 | 11/2018 |

OTHER PUBLICATIONS

First Examination Report of IN Patent Application No. 201914018440, dated Oct. 27, 2020, 6 pages.

* cited by examiner

INTELLIGENT BASEBAND OPERATING MODE SELECTION FOR 5G BASED DEVICE

PRIORITY CLAIM

This application is a continuation of U.S. patent application Ser. No. 16/400,571, titled "Intelligent Baseband Operating Mode Selection for 5G Based Device" and filed on May 1, 2019, which claims priority to U.S. Provisional Patent Application No. 62/670,531, titled "Intelligent Baseband Operating Mode Selection for 5G Based Device" and filed on May 11, 2018, which are both hereby incorporated by reference in their entirety, as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for intelligently managing baseband operating modes in a user equipment device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices and improve user experience. Therefore, improvements in the field are desired.

SUMMARY

Embodiments are presented herein of, inter alia, systems, apparatuses, and methods for dynamic mode selection for a user equipment device (UE) and an accessory wireless device.

The accessory wireless device may be a link budget limited device, such as an accessory device with a relatively limited communication range, e.g., due to device design constraints. Additionally or alternatively, battery power may be a limited resource for the accessory wireless device, such that managing the power consumption resulting from cellular service operations may be desirable.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
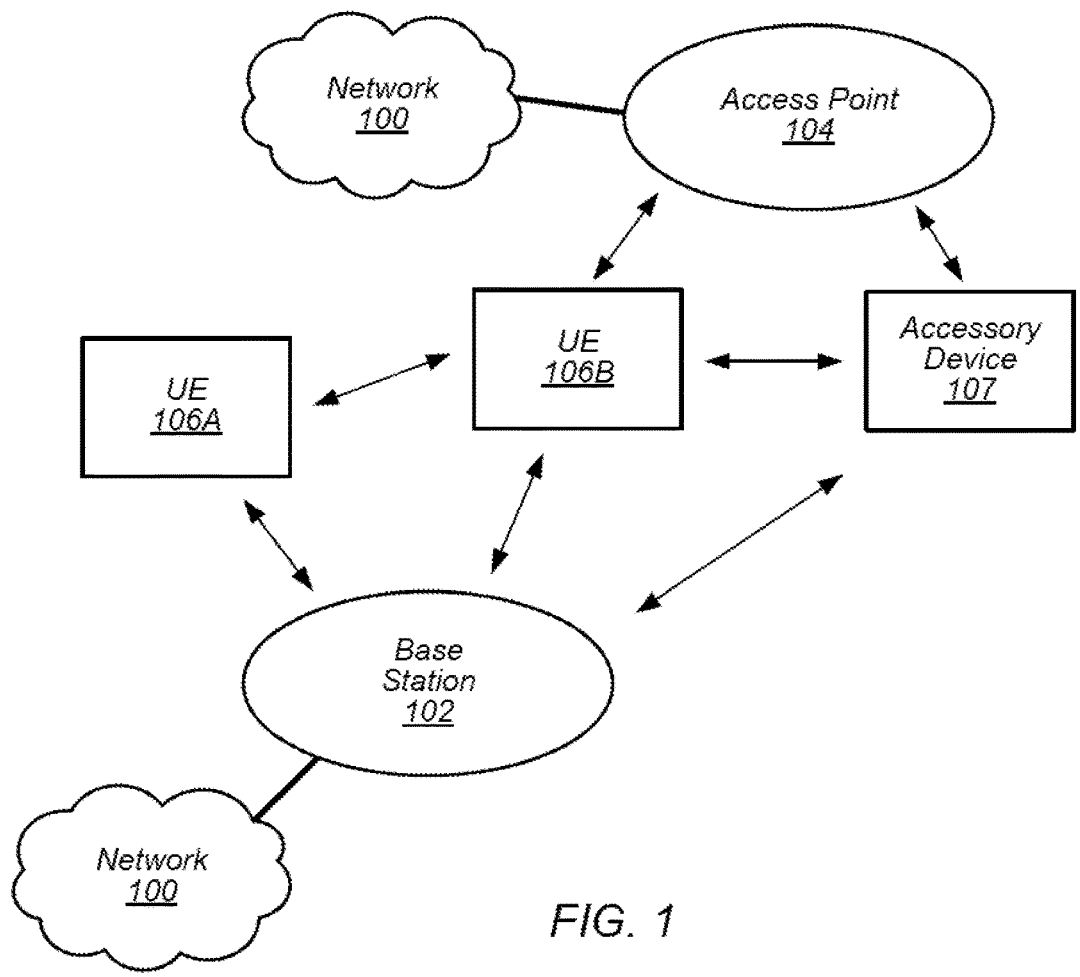
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
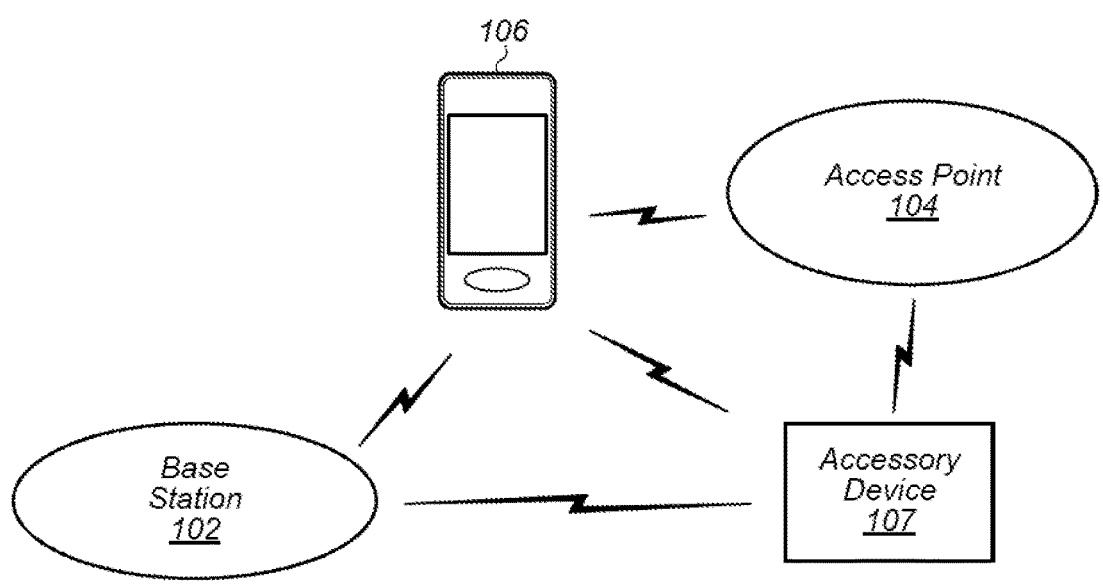
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eIRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, NR, WLAN, BLUETOOTH™ (referred to as Bluetooth herein for simplicity), one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

As shown, the exemplary wireless communication system also includes a Wi-Fi access point 104, which communicates over a transmission medium with the wireless device 106B as well as accessory device 107. The Wi-Fi Access point also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device (AD) 107 may be any of various types of wireless devices, typically a wearable device that has a smaller form factor, and may have limited battery, output power and/or communications abilities relative to UEs 106. As one common example, the UE 106B may be a smart phone carried by a user, and the AD 107 may be a smart watch worn by that same user. The UE 106B and the AD 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The accessory device 107 includes cellular communication capability and hence is able to directly communicate with cellular base station 102. However, since the accessory device 107 is possibly limited in one or more of communication, output power and/or battery power, the accessory device 107 may in some instances selectively utilize the ULE 106B as a proxy for communication purposes with the base station 102 and hence to the network 100, and/or may prioritize access to the network 100 obtained via the access point 104. In other words, the accessory device 107 may selectively use the cellular communication capabilities of its companion device (e.g., UE 106B) and/or its Wi-Fi communication capability to conduct its communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may have cellular communication capability and be capable of directly communicating with the base station 102, as shown. FIG. 2 also illustrates the accessory device 107 in communication with access point 104. The accessory device 107 may also have Wi-Fi communication capability and be capable of directly communicating with the access point 104, as shown.

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102 and/or access point 104. In other words, the accessory device 107 may provide voice/data packets intended for the base station 102 or access point 104 over the short range link to the UE 106, and the UE 106 may use its cellular or Wi-Fi functionality to transmit (or relay) this voice/data to the base station/access point on behalf of the accessory device 107. Similarly, the voice/data packets transmitted by the base station/access point and intended for the accessory device 107 may be received by the cellular/Wi-Fi functionality of the UE 106 and then may be relayed over the short range link to the accessory device. As noted above, the UE 106 may be a mobile phone, a tablet, or any other type of hand-held device, a media player, a computer, a laptop or virtually any type of wireless device.

At least in some instances, the accessory device 107 may also or alternatively selectively utilize one or the other of cellular or Wi-Fi communication capability to communicate directly with a cellular base station or a Wi-Fi access point, e.g., even if both options may be available. For example, if both wireless link options are available and are capable of providing the communication services currently desired by the accessory device 107, the accessory device 107 might prioritize the Wi-Fi link, e.g., to potentially reduce device power consumption and/or if the Wi-Fi link is considered to have a lower economic cost. As described further subsequently herein, the UE 106 and/or the accessory device 107 may manage the wireless connectivity of the accessory device 107 in accordance with any of a variety of additional or alternative considerations at various times.

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities). Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs, and/or may otherwise selective utilize its wireless communication capabilities. As previously noted, when the UE 106 is capable of being used by the accessory device 107 as a proxy, the UE 106 may be referred to as a companion device to the accessory device 107.

Figure 3:
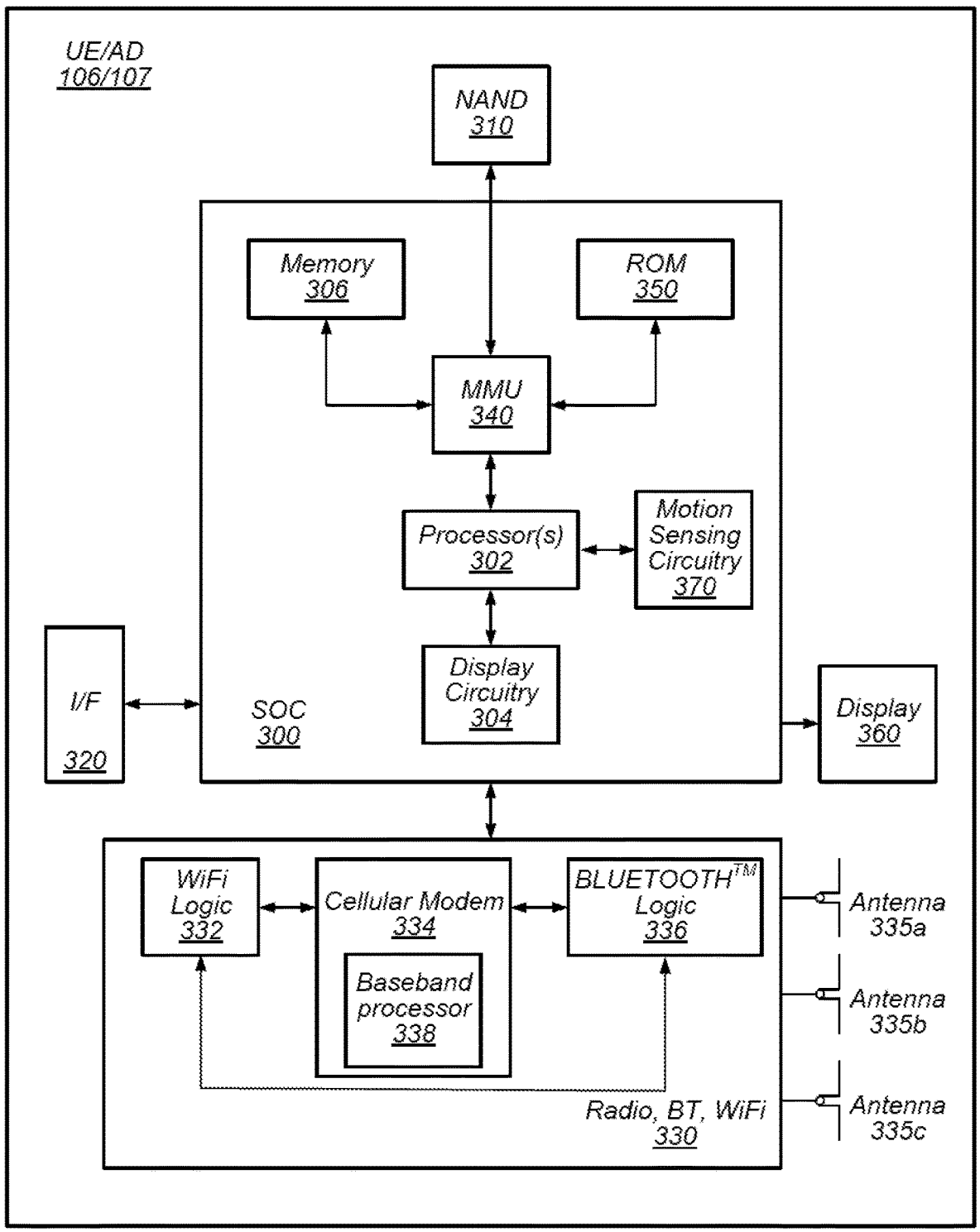
FIG. 3 is a block diagram illustrating an example wireless device, according to some embodiments.

FIG. 3—Example Block Diagram of a UE Device

FIG. 3 illustrates one possible block diagram of an UE device, such as UE device 106 or accessory device 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments may include multiple antennas 335a, 335b, and/or 335c, for performing wireless communication with base stations and/or other devices. For example, the UE device 106/107 may use antennas 335a-c to perform the wireless communication. As noted above, the UE device 106/107 may in some embodiments be configured to communicate wirelessly using a plurality of wireless communication standards and/or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network (other WLAN communication protocols are also possible). The Bluetooth Logic 336 is for enabling the UE device 106/107 to perform Bluetooth communications. The cellular modem 334 may be a lower power cellular modem capable of performing cellular communication according to one or more cellular communication technologies.

The cellular modem 334 may be powered by a baseband processor (BB) 338, which may be separately powered on or off depending on whether the UE 106/107 is actively conducting cellular communications. For example, the BB 338 may be powered off independently of whether the UE is actively conducting WiFi or Bluetooth communications.

As described herein, UE 106/107 may include hardware and software components for implementing embodiments of this disclosure. For example, one or more components of the wireless communication circuitry 330 (e.g., Wi-Fi logic 332, cellular modem 334, Bluetooth logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
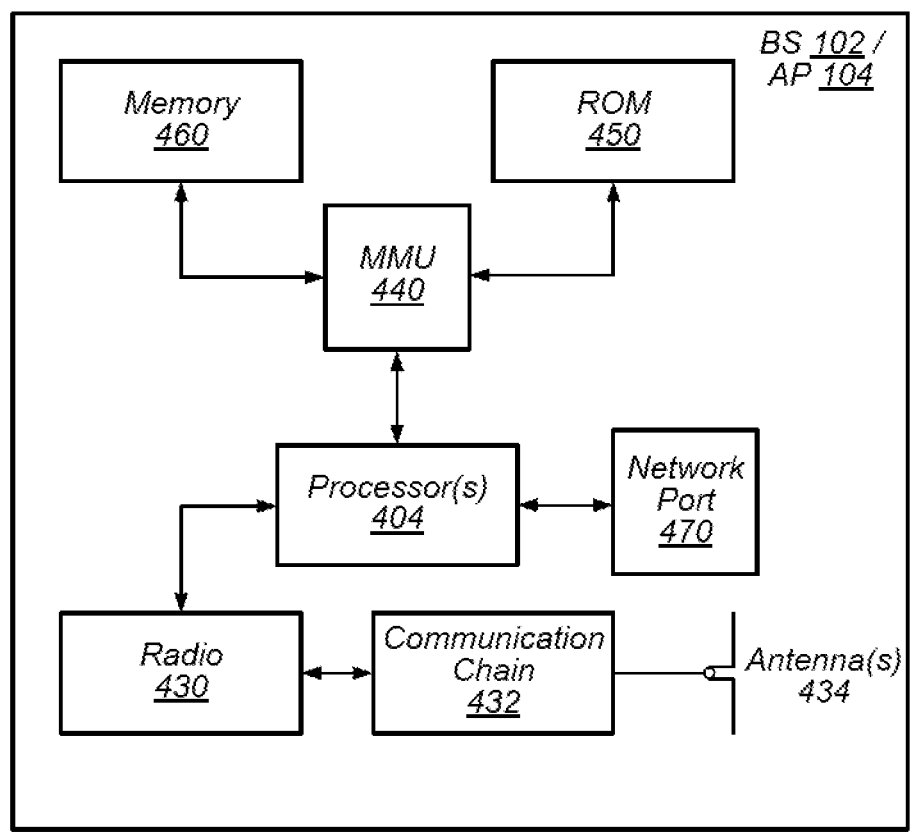
FIG. 4 is a block diagram illustrating an example base station and access point, according to some embodiments.

FIG. 4—Block Diagram of a Base Station

FIG. 4 illustrates an example block diagram of a base station 102 or access point 104, according to some embodiments. It is noted that the base station of FIG. 4 is merely one example of a possible base station. As shown, the base station 102/access point 104 may include processor(s) 404 which may execute program instructions for the base station 102/access point 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102/access point 104 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102/access point 104 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102/access point 104 may be configured to communicate wirelessly using multiple wireless communication standards. In some instances, the base station 102 may include multiple radios, which may enable the base station 102 to communicate according to multiple wireless communication technologies. For example, as one possibility, the base station 102/access point 104 may include an LTE radio for performing communication according to LTE as well as a Wi-Fi radio for performing communication according to Wi-Fi. In such a case, the base station 102/access point 104 may be capable of operating as both an LTE base station and a Wi-Fi access point. As another possibility, the base station 102/access point 104 may include a multi-mode radio which is capable of performing communications according to any of multiple wireless communication technologies (e.g., LTE and Wi-Fi, LTE and UMTS, LTE and CDMA2000, UMTS and GSM, etc.). As still another possibilty, the base station 102/access point 104 may be configured to act exclusively as a Wi-Fi access point, e.g., without cellular communication capability.

As described further subsequently herein, the BS 102/AP 104 may include hardware and software components for implementing or supporting implementation of features described herein. The processor 404 of the base station 102/access point 104 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102/AP 104, in conjunction with one or more of the other components 430, 432, 434, 440, 450, 460, 470 may be configured to implement or support implementation of part or all of the features described herein.

Figure 5:
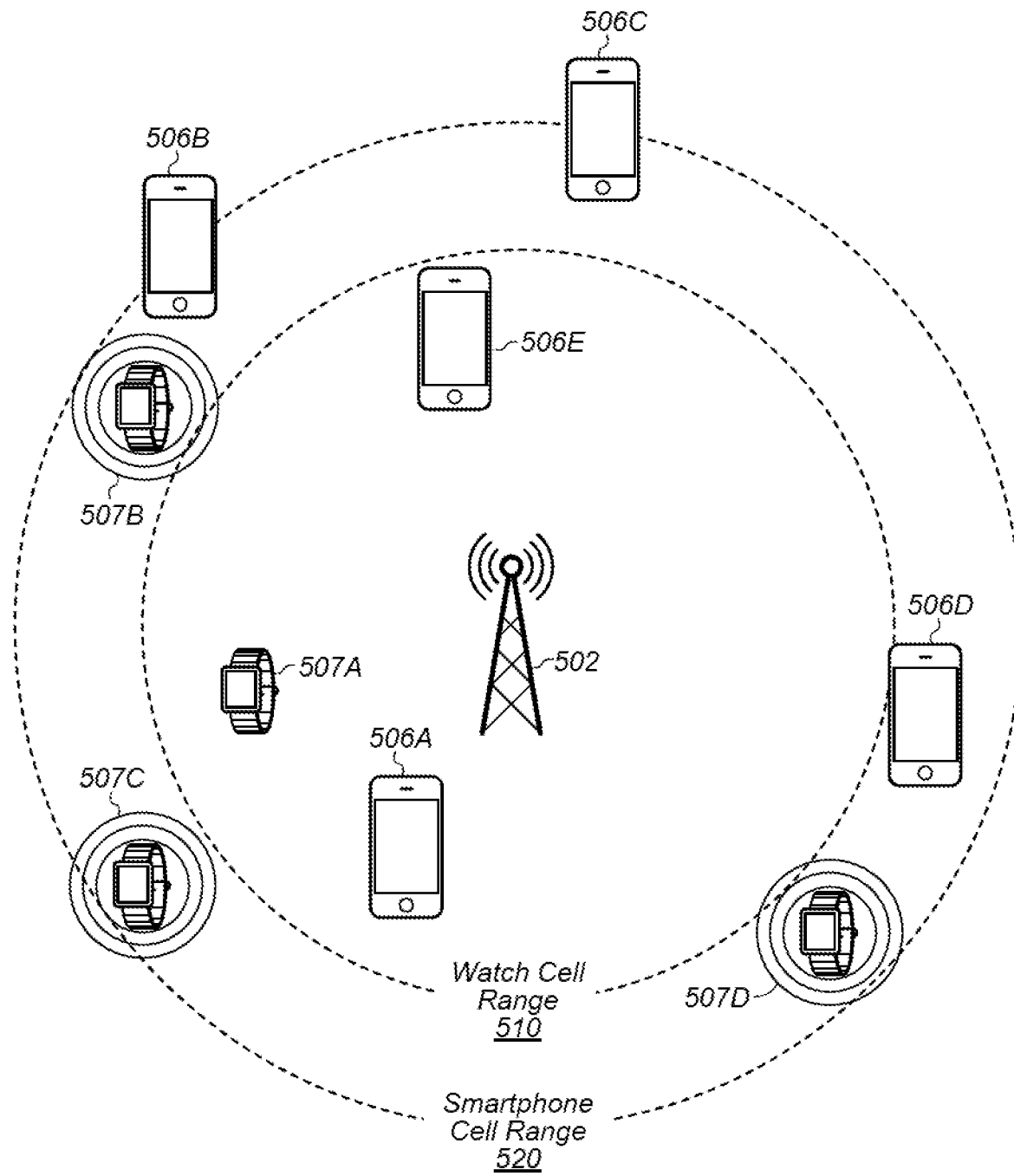
FIG. 5 illustrates a possible example coverage scenario for smartphones and smart watches, according to some embodiments.

FIG. 5—Example Coverage Scenario

FIG. 5 illustrates one possible example of a coverage scenario for smartphones and smart watches, according to some embodiments. As shown, a base station 502 may provide a cell for a variety of wireless devices, including various smartphones 506 and various smart watches 507. Such different types of devices may have differing characteristics that result in different effective communication ranges. Thus, as shown, the effective watch cell range 510 may be smaller than the effective smartphone cell range 520. As a result, while all of the illustrated smartphones (506A, 506B, 506C, 506D, 506E) may be within communicative range of the base station 502 and thus may be able to receive cellular communication service from the cell, only one of the illustrated smart watches (507A) may be within communicative range of the base station 502, and the remainder of the illustrated smart watches (507B, 507C, 507D) may be outside of communicative range of the base station 502. Unless there are one or more other cells within range of these smart watches 507B-D, they may be unable to obtain cellular communication service and may accordingly experience cellular service loss. Note that while FIG. 5 illustrates a scenario including smartphones and smart watches, similar scenarios with other types of UE companion devices and associated accessory devices, as variously described above, are also within the scope of the instant disclosure.

Thus, since cellular base station deployment may at least in some instances be arranged to provide efficient cellular communication coverage for smartphones and other devices with similar cellular communication ranges, coverage scenarios such as illustrated in FIG. 5 may result in smart watches and/or other devices with smaller than average cellular communication ranges (e.g., link budget limited devices) experiencing a greater variety of coverage conditions than some other devices, e.g., potentially including more commonly experiencing cell edge and/or out-of-service conditions, which may in turn affect the relative desirability of a cellular link at various times. Further, since cellular service recovery operations, cellular communications when at the edge of cellular communication range, and even cellular communications in general may at least in some instances be relatively more power consuming than Wi-Fi communications, it may be the case that some link budget limited devices with both cellular and Wi-Fi communication capability may be configured to prefer Wi-Fi communication over cellular communication.

For example, techniques that consider battery power as a limited resource and only selectively utilize cellular communication capabilities (e.g., potentially including when they might be available), particularly when an equivalently functional Wi-Fi communication link (e.g., that may support voice, short messaging service (SMS), and/or other services that might be available via cellular communication) is available, may have a notable beneficial effect on such link budget limited devices, at least in some instances.

However, in some instances, a Wi-Fi link may be available but may not provide equivalent functionality as a cellular link. For example, in some instances, a user could be in a situation in which an accessory device is associated to an un-authenticated Wi-Fi AP, and may try to perform IMS registration, but may be unable to do so. If the accessory device were to assume that having a Wi-Fi link provided sufficient communicative capability that cellular communication capability was not needed at such a time, this could result in a user of the accessory device not being able to use at least some desired communication services. At least for some devices, the only way to remedy such a situation may include the user explicitly forcing a companion device to the accessory device to forget/delete the network provided by the Wi-Fi AP from the companion's settings, and relay the information to the accessory device to clear such an un-authenticated AP from the memory of the accessory device. Thus, in such (and potentially other) instances, it may be useful to provide more nuanced wireless connectivity management techniques for accessory devices that are capable of utilizing multiple wireless communication technologies.

Transitions Between Connectivity Scenarios for Accessory Device

Figure 6:
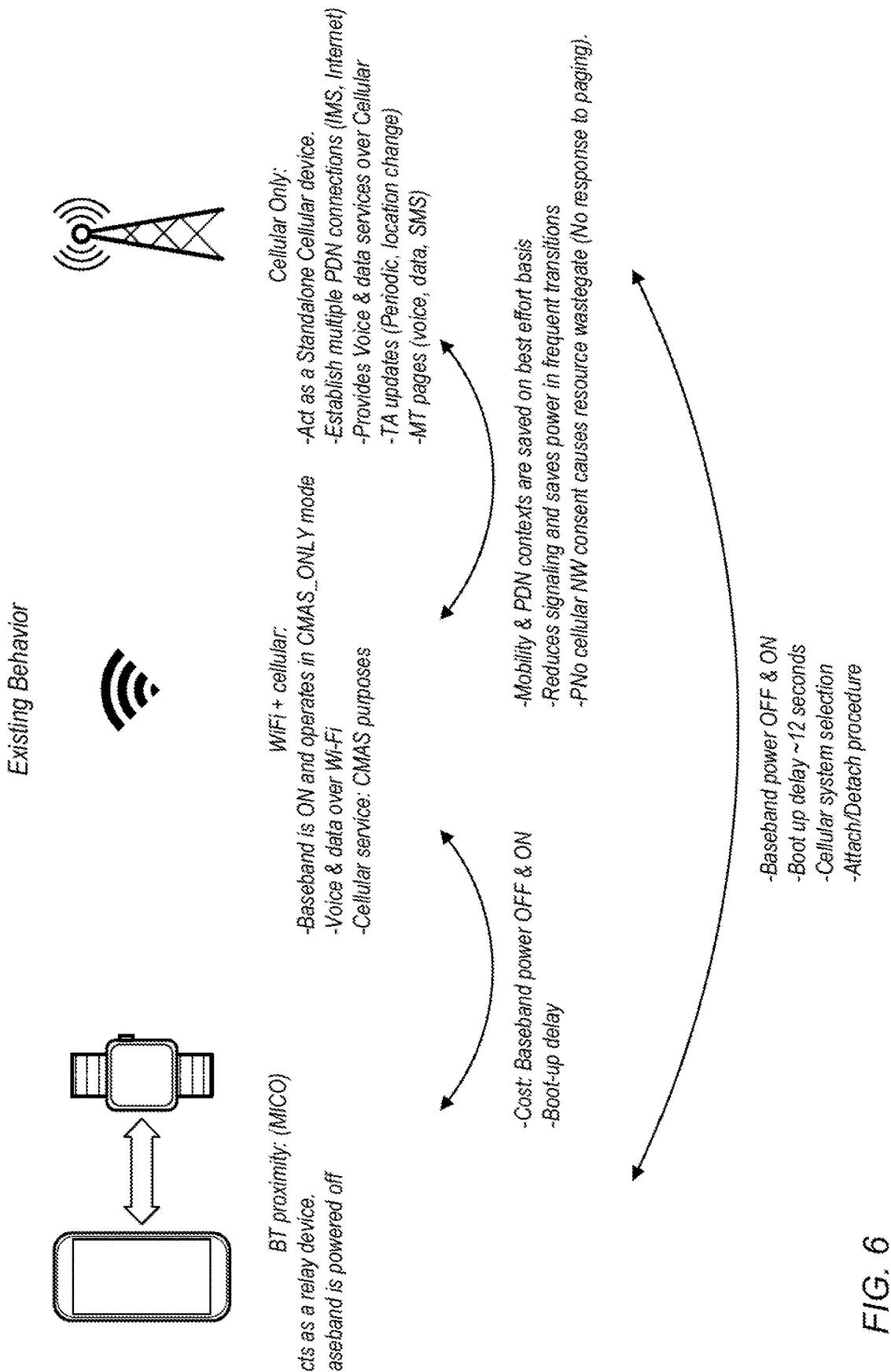
FIG. 6 illustrates existing mode transition behavior, according to the prior art.

FIG. 6 illustrates methods, according to some current implementations, whereby an accessory device such as an AD 107 may switch between various baseband operating modes upon transitioning between three connectivity scenarios: 1) availability of a companion device (UE), 2) availability of a WLAN connection such as a WiFi connection in addition to an available cellular connection (with no available companion device, and 3) availability of a cellular connection only (with no available companion device or WLAN connection).

As illustrated, while the AD 107 is connected (e.g., through Bluetooth (BT) or another short-range RAT) to a companion device, the baseband processor 338 powering the cellular radio of the accessory device may be powered off to preserve battery life, as the accessory device may use the companion device as a relay to communicate with the network. When the connection with the companion device is lost (e.g., if the accessory device moves out of range of the companion device), the accessory device may power on the BB to attempt to connect with the network using one or both of a WLAN connection to an access point and/or a cellular connection with a base station (e.g., an eNB or a gNB).

For example, if both a WLAN connection and a cellular connection are available when the accessory device loses its connection to its companion device, the accessory device may utilize its WLAN radio to establish a connection with the network using an available WLAN access point, and the accessory device may communicate voice and/or data over the WLAN connection. The accessory device may further power on its BB, and may operate its cellular radio in a commercial mobile alert system (CMAS)-only mode. In other words, the accessory device may primarily utilize the WLAN connection for performing network communications, but may power on the BB for emergency messaging purposes only.

Alternatively, if only a cellular connection is available when the accessory device (AD) loses its connection to its companion device, the AD may power on its BB and act as a standalone cellular device. For example, the AD may camp on a base station and perform a full range of typical cellular voice and/or data communications using its cellular radio.

Switching between these three scenarios (i.e., BT proximity to companion device, availability of WLAN and cellular without a companion device in range, and availability of cellular only without a companion device in range) may involve significant time delay and energy expenditure to boot up the baseband processor, perform cellular system selection, and/or attach/detach procedures with wireless access points and/or cellular base stations.

For example, when a BT connection with the companion device is lost, a significant power cost may be incurred to perform baseband image download, system selection, SIM initialization, etc., and a boot-up delay of approximately 12 seconds (or another duration, depending on the device) may be incurred in booting up the baseband processor. This may adversely affect the user experience, as a data application may take more time when the accessory device is located at the edge of a BT coverage range. Additionally, the AD may experience a data application query failure due to transport layer unavailability, and/or live streaming data stalls of up to 20 seconds during the transition from a BT connection with the companion device to a cellular connection.

Additionally, switching between a cellular only scenario and a WLAN plus cellular scenario may incur an undesirable burden on the AD. For example, when the AD moves from "Cellular Only" to "WiFi+Cellular", the baseband may transition to CMAS-only mode without any signaling between AD and the network, and the mobility and public data network (PDN) contexts may be saved on a best effort basis. From the network side, it may appear as though device went out of service. For mobile terminated data, the NW may page the AD and the AD may not respond, resulting in network resource wastage. Often, the network may remove the device context of the AD because the AD is not reachable.

When the AD moves from "WiFi+Cellular" to "Cellular Only", the AD may try to resume the mobility and PDN contexts by sending "service request" or "tracking area update" procedures to the network. Sometimes these contexts may be released, causing the AD to start an attach procedure.

Embodiments herein propose solutions to improve on these legacy procedures by implementing dynamic device mode selection and utilizing a mobile-initiated communication only (MICO) mode to preserve time and energy in an accessory device while switching between different connectivity scenarios.

Figure 7:
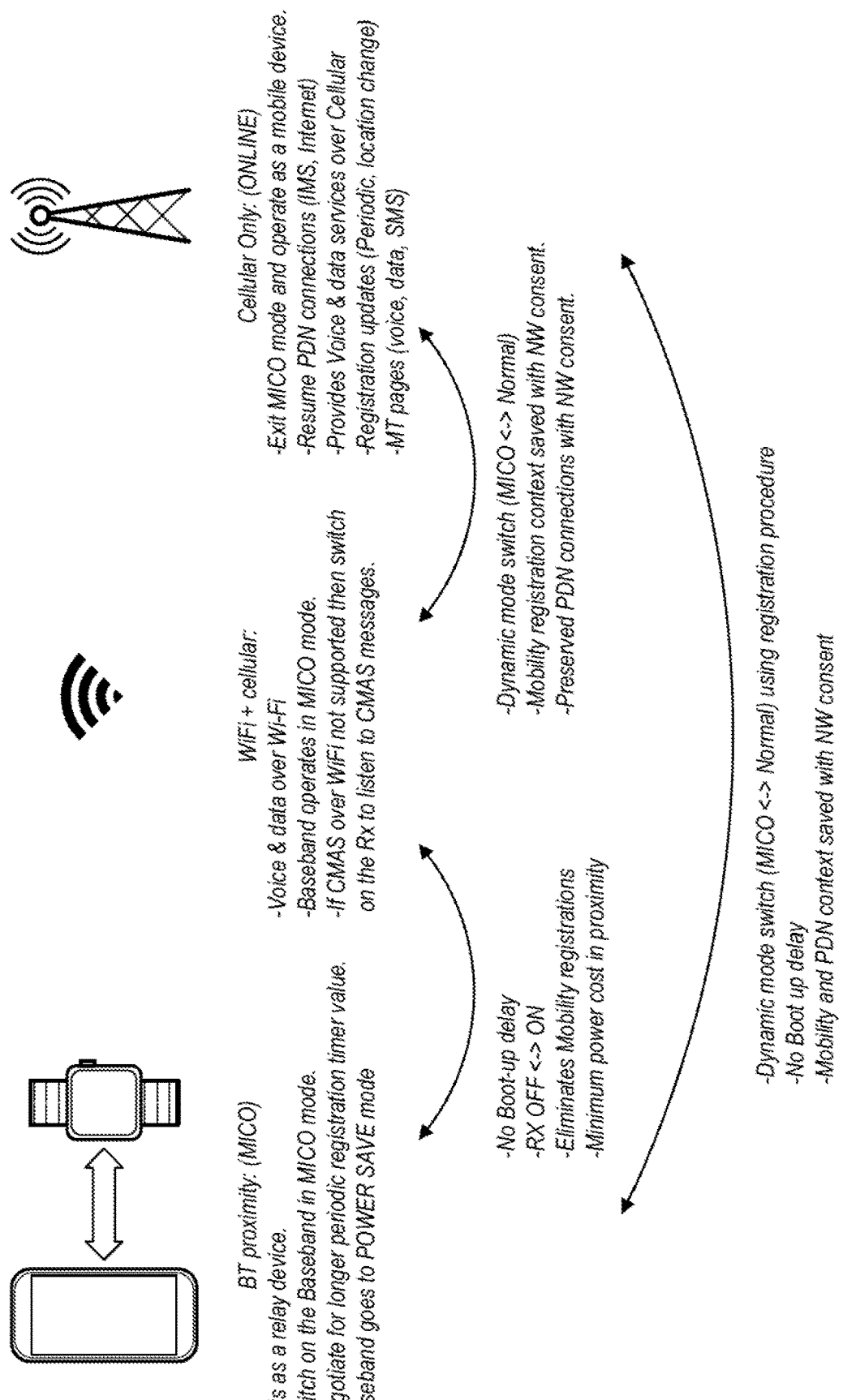
FIG. 7 illustrates dynamic mode selection, according to some embodiments.

FIG. 7—Dynamic Device Mode Selection

FIG. 7 is a schematic diagram illustrating a method for an accessory device (AD) to utilize dynamic device mode selection to switch between MICO mode and a normal operating mode during a transition between different connectivity scenarios. As illustrated, while the AD is paired with its companion device, the AD may use the cellular and/or WLAN radio of the companion device to relay information to the network. The AD may switch on its cellular baseband in a MICO mode while paired with the companion device, wherein only the AD may initiate communications with the network, as the AD is considered unreachable by the network and will not be paged by the network. The AD may also operate in MICO mode when both a WLAN and a cellular connection are available, but the AD is not paired to a companion device. Finally, when only a cellular connection is available (e.g., when both a companion device and a WLAN connection are unavailable), the AD may exit MICO mode and operate as a normal cellular device. The following sections describe in greater detail procedures for transitioning between the three illustrated connectivity scenarios, according to some embodiments.

Bluetooth Proximity→WiFi+Cellular:

In some embodiments, when the AD loses its BT connection to the companion device and enters an environment with available WLAN and cellular signals, the baseband may continue to operate in MICO mode over cellular access. If CMAS over the WLAN connection is not supported, the AD may switch on its cellular receiver to listen to CMAS messages. Additionally, the AD may register to a 5G network (NW) over its WLAN access for the services like voice and/or data.

Bluetooth Proximity→Cellular Only

In some embodiments, when the AD loses its BT connection to the companion device and enters an environment with an available cellular connection only (e.g., without an available WLAN connection), the AD may initiate a registration procedure to exit MICO mode and enter a full cellular connectivity mode. Advantageously, this registration procedure may be initiated without a baseband boot-up delay, as the baseband is already powered on in MICO mode, thereby improving data application response time.

Cellular Only→WiFi+Cellular:

In some embodiments, the AD may transition from a cellular only mode to a cellular plus WLAN mode (e.g., the AD may have an established cellular connection and may move into proximity of a WLAN access point). In these embodiments, the baseband may enter MICO mode using a registration procedure. The mobility and PDN contexts may be saved for future use, with consent from the network. In some embodiments, If CMAS over the WLAN connection is not supported, the cellular receiver may be switched on for CMAS purposes.

Cellular Only→Bluetooth proximity:

In some embodiments, the AD may transition from a cellular only mode into pairing proximity of its companion device. In these embodiments, the baseband may enter MICO mode through a registration procedure. Mobility & PDN contexts may be saved with consent from the network.

WiFi+Cellular→Cellular Only:

In some embodiments, the AD may transition from having available both a WLAN and a cellular connection to only having available a cellular connection (e.g., the AD move out of range of a WLAN access point). In these embodiments, the baseband may exit MICO mode using a registration procedure. The baseband may resume mobility and PDN contexts.

WiFi+Cellular→Bluetooth Only:

In some embodiments, the AD may have available both a WLAN and a cellular connection and may transition to be reachable by its companion device. In these embodiments, the UE may pair with the companion device and the baseband may continue to operate in MICO mode. If not already powered off, the AD may power off its cellular receiver to preserve power.

Hybrid MICO Mode Over 3GPP Access Non-3GPP Access

In some embodiments, a MICO mode-enabled UE may register to the same 5G gNB using non-3GPP access as well as 3GPP access. In some embodiments, the UE may operate in MICO mode over 3GPP access and non-MICO mode over non-3GPP access at the same time. An Access and Mobility Management Function (AMF) may include an "all PLMN registration area allocated" indication in the MICO indication information element (IE) to the UE over 3GPP access. The AMF may also accept the device registration over non-3GPP access as one single common registration area for an entire public land mobile network (PLMN).

It may be possible for a MICO mode UE to be in a connected state "CM-CONNECTED" over non-3GPP access and an idle state "CM-IDLE" over 3GPP access. In this case, the AMF may not page the UE over 3GPP access as the device is in MICO mode. The AMF may send data/signaling over non-3GPP access without any restrictions, as allowed by network policy.

In this mode, the AMF may not send 3GPP access-related notification messages over non-3GPP access and the AMF may still honor device MICO mode privileges over 3GPP access. In some embodiments, a UE may dynamically change its device mode between MICO and non-MICO based on various parameters such as location, non-3GPP and/or 3GPP cellular coverage, user actions like an emergency call, etc., to improve device battery performance.

Potential Behaviors for UE and the AMF

In some embodiments, an AD may operate in MICO mode over 3GPP access and non-MICO mode over non-3GPP access, and it may register with the same AMF over both accesses for the same PLMN.

In some embodiments, when the device is trying to register for MICO mode over 3GPP access, if the device was already registered over non-3GPP access as one single common registration area for an entire PLMN, then the AMF may choose to accept device registration with an "all PLMN registration area allocated" indication in the MICO indication IE for the same PLMN and the AMF may select the N3GPP tracking area information (TAI) for the entire PLMN for 3GPP access and for non-3GPP access.

In some embodiments, when MICO mode is activated and if the UE is also registered over the non-3GPP access, the AMF may not send a notification message with an access type indicating 3GPP access over the non-3GPP access for packet data unit (PDU) sessions associated with 3GPP access.

In some embodiments, if network policy allows delivery of downlink (DL) network access stratum (NAS) transport messaging either through 3GPP access or non-3GPP access, the AMF may select non-3GPP access if the UE is in MICO mode and in 5GMM-IDLE state for 3GPP access. Otherwise, the AMF may select either 3GPP access or non-3GPP access. In some embodiments, this may be applied to other services besides DL NAS transport messages, which may carry the downlink PDUs over a signaling or data path.

In some embodiments, the AD may operate in MICO mode over 3GPP access and non-MICO mode over non-3GPP access, and it may register with different AMFs to get services from two different PLMNs. The network may accept registration from a single common registration area for an entire PLMN, for a particular tracking area, or from a set of tracking areas for each access independently.

Figure 8:
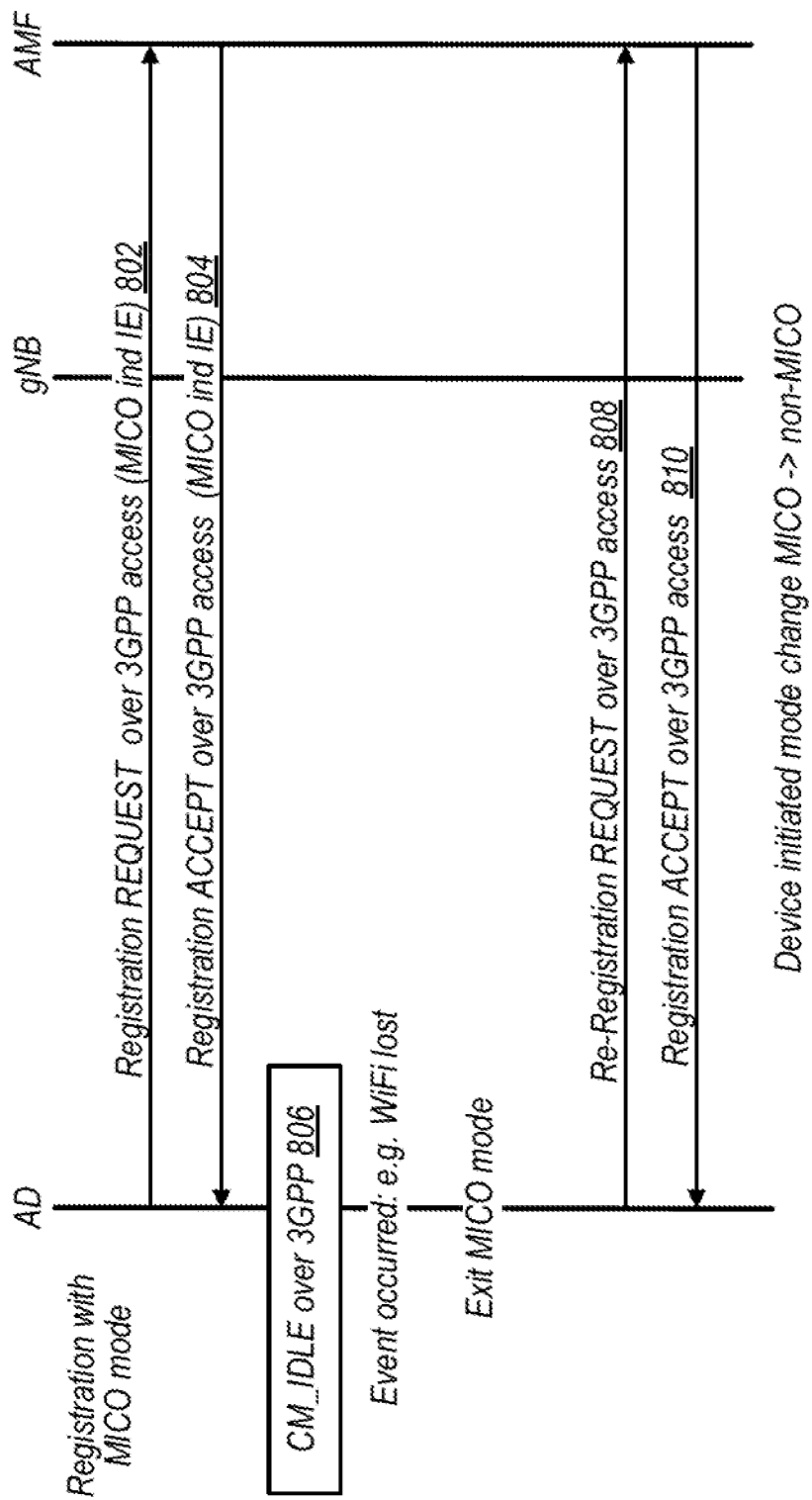
FIG. 8 is a communication flow diagram illustrating an exemplary method for performing dynamic mode selection by a user equipment device (UE), according to some embodiments.

FIG. 8—User-Initiated MICO to Non-MICO Mode Transition

In some embodiments, the AD may dynamically initiate transitions of a cellular connection into and out of MICO based on a variety of events. For example, the AD may dynamically change its device mode between MICO and non-MICO based on device location, wherein the AD may always propose to operate in MICO mode in a home country and non-MICO mode in roaming country. Alternatively or additionally, the AD may transition between MICO and non-MICO mode based on properties of is connected WLAN access point. For example, the AD may choose to operate in MICO mode over 3GPP access when it selects a frequently visited WiFi network and is registered to the 5G core network through non-3GPP access. For all other Wi-Fi access points selected, the AD may choose to operate in non-MICO over 3GPP access.

As illustrated in FIG. 8, the AD may transmit a registration request over 3GPP access at step 802 to the AMF via the gNB with a MICO indicator information element (IE), to request that the UE wishes to enter MICO mode. The AMF may respond at step 804 through the gNB with a registration accept message over 3GPP access, whereby the UE may enter MICO mode and transition to a connection management (CM) idle state at step 806.

In some embodiments, when access point coverage is lost (e.g., if the WiFi signal is lost), the AD may exit from MICO mode and may re-register with normal mode over 3GPP access, to resume any ongoing voice and/or data sessions over cellular 3GPP access. In some embodiments, the AD may exit from MICO mode over 3GPP access based on user-specific events, such as a call, data, and/or SMS request failure over non-3GPP access, or upon user-initiated powering down of the WLAN radio of the AD.

As illustrated, to exit MICO mode the AD may transmit a re-registration request at step 808 over 3GPP access to the AMF without a MICO mode indicator IE (i.e., requesting re-registration in non-MICO mode), and in response, the AD may receive a registration accept message at step 810 from the AMF. The AD may thereby initiate a mode change to non-MICO mode, to commence normal cellular communications with the gNB.

Figure 9:
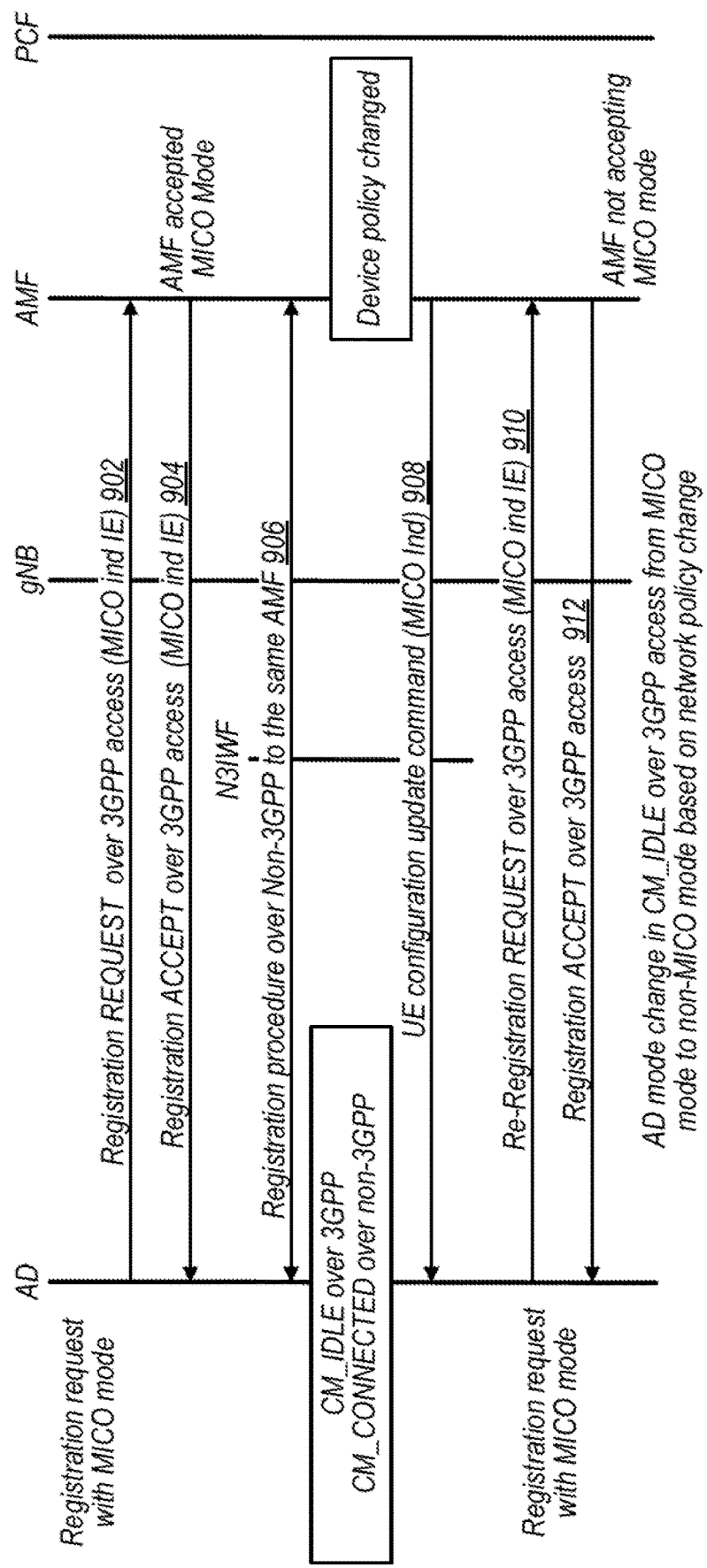
FIG. 9 is a communication flow diagram illustrating an exemplary method for performing dynamic mode selection by a network entity, according to some embodiments.

FIG. 9—Network-Initiated MICO to Non-MICO Mode Transition

In some embodiments, transitions between MICO and non-MICO mode may be initiated by the network. For example, network-initiated mode change may occur when a MICO mode-enabled device is in a CM_IDLE state over 3GPP access. In current implementations, after the AD and network negotiate the MICO mode, the network may transition the AD from MICO to non-MICO mode when the AD is in a CM_CONNECTED state over 3GPP access. The network may have difficulty in revoking MICO mode when the AD is in CM_IDLE state over 3GPP access. Network-initiated transitions may be desirable when the device policy changes on the network side.

In these embodiments, the AMF may use non-3GPP access to deliver a configuration update to the AD, which may lead the AD to trigger re-registration, whereupon the network may choose to not grant the MICO mode.

As illustrated, the AD may initially establish MICO mode with the AMF over 3GPP access, similar to the method described above in reference to FIG. 8, whereby a registration request message is sent at step 902 and a registration accept message is received at step 904 to establish MICO mode for 3GPP access with the network. Additionally, the AD may independently establish a registration procedure over non-3GPP access (e.g., over a WiFi network) to the same AMF at step 906 via a non-3GPP Inter-Working Function (N3IWF). The AD may subsequently operate in a CM_IDLE state over 3GPP access (i.e., in MICO mode), while operating in a CM_CONNECTED state over non-3GPP access. At this stage, the network may observe a device policy change such that the network may desire to transition the AD to a non-MICO mode over 3GPP access. Because the AD is not listening for messages over 3GPP access (e.g., because it is in MICO mode), the network may utilize the CM_CONNECTED state over non-3GPP access to transmit a UE configuration update command with a MICO indicator at step 908 via the N3IWF, effectively requesting that the AD re-negotiates establishment of the MICO mode. This may in turn cause the AD to reattempt its registration request over 3GPP access at step 910, with a MICO mode indicator information element. However, the AMF may respond with a registration accept that does not include MICO indicator information element, to re-register the connection with the 3GPP network in a non-MICO mode at step 912, whereby the AD may conduct a mode change from MICO mode to non-MICO mode over the 3GPP access.

These embodiments allow the network to modify the device policy even when MICO device is in CM-IDLE state. Advantageously, this may give flexibility for the network to deactivate and/or re-activate the MICO mode at any time.

Figure 10:
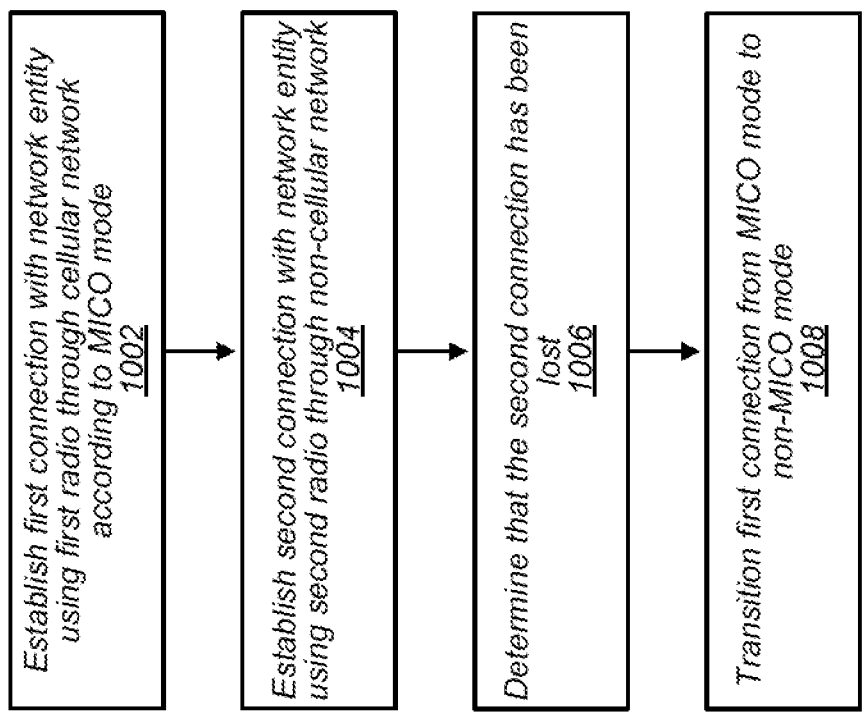
FIG. 10 is a flowchart diagram illustrating an exemplary method for performing dynamic mode selection while an accessory device has an available cellular and non-cellular network connection, according to some embodiments.
Figure 11:
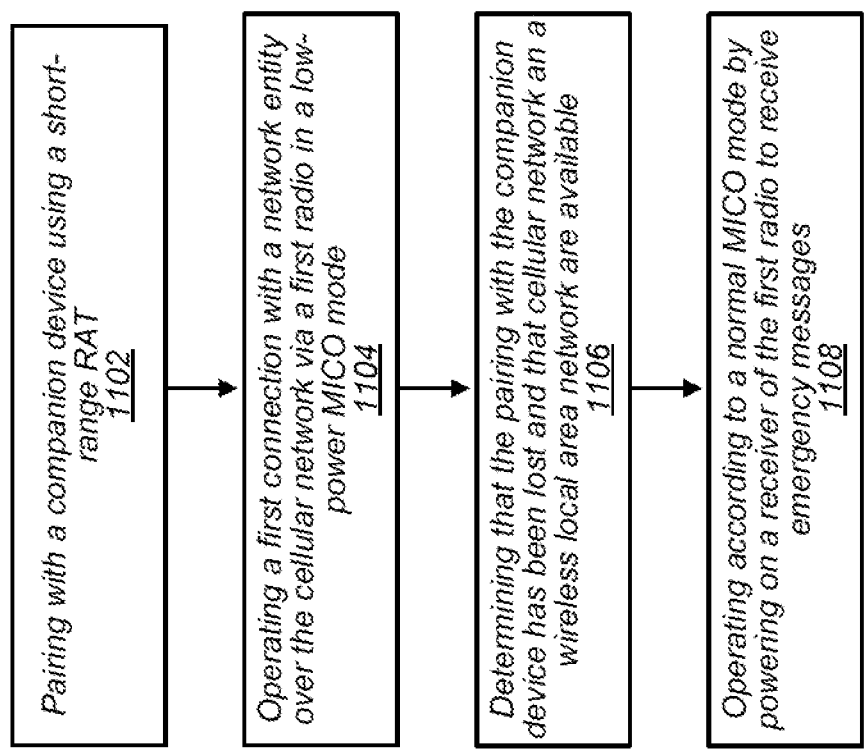
FIG. 11 is a flowchart diagram illustrating an exemplary method for performing dynamic mode selection while an accessory device is paired with a companion device, according to some embodiments.

FIGS. 10-11—Flowcharts for Transitioning Between MICO and Non-MICO Modes

FIGS. 10-11 are flowchart diagrams illustrating methods for utilizing dynamic device mode selection to switch between MICO mode and a normal operating mode during transitions between different connectivity scenarios, according to some embodiments. More specifically, FIG. 10 illustrates a method for transitioning from a connectivity scenario when a cellular connection and non-cellular connection with a network entity are both initially available. Note that while such use of wireless connection management techniques may be particularly beneficial to link budget limited devices such as an accessory device 107, it should be noted that such techniques may also be beneficial to non-link budget limited wireless devices (e.g., including wireless devices with larger cellular communication ranges, such as a UE 106), at least in some instances. Accordingly, it should be noted that any or all aspects of the method of FIG. 10 may also or alternatively be used in conjunction with such devices if desired.

While aspects of the method of FIG. 11 are described as implemented by an accessory wireless device (such as an accessory device 107) illustrated in and described with respect to FIGS. 1-3, the described method may also be implemented by a companion wireless device (such as a UE 106) and more generally in conjunction with any of the computer systems or devices shown in the above Figures, among other devices, as desired.

In various embodiments, some of the elements of the methods shown may be performed concurrently, in a different order than shown, may be substituted for by other method elements, or may be omitted. Additional method elements may also be performed as desired. As shown, the method may operate as follows.

At 1002, the accessory device (AD) may establish a first connection with a network entity with the first radio through the cellular network according to a mobile-initiated connection only (MICO) mode. In some embodiments, while operating according to the MICO mode, the AD is configured to not monitor for paging communications using the first radio. In some embodiments, establishing a first connection with the network entity with the first radio through the cellular network according to the MICO mode comprises transmitting a registration request to the network entity with a MICO mode indicator information element.

At 1004, a second connection may be established with the network entity with the second radio through a non-cellular network. For example, the AD may establish a connection with the network entity through a WiFi access point, where the second radio is a WiFi radio, or another WLAN radio. In some embodiments, the AD may determine that emergency messaging is not available over the non-cellular network. Based on determining that emergency messaging is not available over the non-cellular network, the AD may periodically activate a receiver of the first radio to monitor for emergency messages using the cellular network.

At 1006, it is determined that the second connection with the network entity has been lost. For example, the AD may move out of range of the wireless access point through which the AD is connected via the second connection, while the cellular signal is still available.

At 1008, the first connection may be transitioned from the MICO mode to a non-MICO mode based at least in part on the determination that the second connection has been lost. The first connection with the network entity may be preserved upon transitioning to the non-MICO mode. After transitioning the first connection to a non-MICO mode, the AD may conduct normal voice and/or data communications with the network entity via the first connection. In some embodiments, transitioning the first connection from the MICO mode to the non-MICO mode is further based on a location of the AD, as described in greater detail above.

In some embodiments, transitioning the first connection from the MICO mode to the non-MICO mode is network-initiated, and comprises transmitting a re-registration request to the network entity with the MICO mode indicator information element, and receiving a registration accept message from the network without the MICO mode indicator information element. In other embodiments, transitioning the first connection from the MICO mode to the non-MICO mode is initiated by the UE, and comprises transmitting a re-registration request to the network entity without the MICO mode indicator information element.

In some embodiments, it may be determined that a companion device has paired with the AD using the third radio. The AD may transition a baseband processor of the first radio of the AD into a low power mode based at least in part on the determination that the companion device has paired with the AD using the third radio, wherein a receiver of the first radio is powered down in the low power mode. The AD may maintain the first connection in a lower power MICO mode in response to determining that a companion device has paired with the AD.

In some embodiments, the AD may negotiate with the network entity to establish a long-term registration timer value associated with the first connection based at least in part on the determination that the companion device has paired with the AD using the third radio.

FIG. 11 illustrates a method for transitioning from a connectivity scenario when the AD is initially paired with a companion device, and the pairing is subsequently lost. Note that while such use of wireless connection management techniques may be particularly beneficial to link budget limited devices such as an AD 107, it should be noted that such techniques may also be beneficial to non-link budget limited wireless devices (e.g., including wireless devices with larger cellular communication ranges, such as a UE 106), at least in some instances. Accordingly, it should be noted that any or all aspects of the method of FIG. 11 may also or alternatively be used in conjunction with such devices if desired.

While aspects of the method of FIG. 11 are described as implemented by an accessory wireless device (such as an AD 107) illustrated in and described with respect to FIGS. 1-3, the described method may also be implemented by a companion wireless device (such as a UE 106) and more generally in conjunction with any of the computer systems or devices shown in the above Figures, among other devices, as desired.

In various embodiments, some of the elements of the methods shown may be performed concurrently, in a different order than shown, may be substituted for by other method elements, or may be omitted. Additional method elements may also be performed as desired. As shown, the method may operate as follows.

At 1102, the AD may pair with a companion device using a short-range radio access technology (RAT) radio. For example, the AD may pair with the companion device using a BLUETOOTH™ connection. The companion device may be a smartphone associated with the AD, which may be a smart watch, for example.

At 1104, based at least in part on pairing with the companion device, the AD may operate a first connection with a network entity over a cellular network via a first radio of the AD in a low power mobile-initiated connection only (MICO) mode, wherein a receiver of the first radio is powered down in the low power MICO mode. In some embodiments, while operating in the low power MICO mode, the AD is configured to not monitor for paging communications using the first radio. In some embodiments, further based at least in part on pairing with the companion device, the AD may negotiate with the network entity to establish a long-term registration timer value associated with the first connection.

At 1106, the AD determines that the pairing with the companion device has been lost and that the cellular network and a wireless local area network are available. For example, AD may move out of range of the companion device, resulting in a loss of pairing.

At 1108, in response to determining that the pairing with the companion device has been lost and that the cellular network and the wireless local area network are available, the AD may operate according to a normal MICO mode by powering on the receiver of the first radio to receive emergency messaging over the cellular network. In some embodiments, and further in response to determining that the pairing with the companion device has been lost and that the cellular network and the wireless local area network are available, the AD may establish a second connection with the network entity with a second radio of the AD through the non-cellular network. For example, the second connection may be a WLAN connection that connects to the network entity via a wireless access point.

In some embodiments, the AD may receive an indication via the second radio from the network entity through the second connection to re-register the first connection, whereby the AD may transmit, using the first radio, a request to re-register the first connection in the normal MICO mode. The AD may receive an acceptance message from the network entity that accepts the request to reregister the first connection in non-MICO mode. The AD may then transition the first connection from the normal MICO mode to non-MICO mode in response to receiving the acceptance message, wherein the first radio is configured to transmit and receive messages from the network entity via the cellular network while in the non-MICO mode. Accordingly, the network entity may utilize the re-registration indication to instigate a transition from MICO mode to non-MICO mode by the AD.

In some embodiments, the AD may determine that the second connection with the network entity over the non-cellular network has been lost, and the AD may transition the first connection from the normal MICO mode to a non-MICO mode based at least in part on the determination that the second connection has been lost, wherein the first radio is configured to transmit and receive messages from the network entity via the cellular network while in the non-MICO mode. For example, based on a loss of the second connection (e.g., if the AD moves out of range of the wireless access point), the AD may automatically transition the first connection to a non-MICO mode, so that voice and/or data communication may resume via the first connection, to avoid an undesirable service interruption.

In some embodiments, operating the first connection with the network entity over the cellular network according to the normal MICO mode comprises transmitting a registration request to the network entity with a MICO mode indicator information element. Further, in some embodiments, transitioning the first connection from the normal MICO mode to the non-MICO mode is network-initiated and comprises transmitting, by the AD, a re-registration request to the network entity with the MICO indicator information element, and receiving a registration accept message from the network without the MICO mode indicator information element. In other embodiments, transitioning the first connection from the MICO mode to the non-MICO mode is initiated by the AD, and comprises transmitting a re-registration request to the network entity without the MICO mode indicator information element.

The following numbered paragraphs describe additional embodiments.

In some embodiments, a method is described for operating a user equipment device (UE), the method comprising establishing a first connection with a network entity through a cellular network using a first radio of the UE according to a mobile-initiated connection only (MICO) mode, establishing a second connection with the network entity through a non-cellular network using a second radio of the UE, receiving an indication by the second radio from the network entity through the second connection to re-register the first connection, transmitting, using the first radio, a request to re-register the first connection in MICO mode, receiving an acceptance message from the network entity that accepts the request to reregister the first connection in non-MICO mode, and transitioning the first connection from MICO mode to non-MICO mode in response to receiving the acceptance message.

In some embodiments, a network entity comprises a first radio configured to communicate with a cellular network, a second radio configured to communicate with a non-cellular network, and a processor coupled to the first radio and the second radio.

The network entity may be configured to establish a first connection with a user equipment device (UE) through the cellular network using the first radio according to a mobile-initiated connection only (MICO) mode, establish a second connection with the UE through the non-cellular network using the second radio, receive a notification from a remote entity that a device policy associated with the UE has changed, at least in part in response to receiving the notification, transmit an indication to the UE through the second connection to re-register the first connection, receive, through the first connection, a request from the UE to re-register the first connection in the MICO mode, and transmit, through the first connection, an acceptance message that indicates acceptance of the request to reregister the first connection in a non-MICO mode.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable non-transitory memory medium comprising program instructions that, when executed by a processor of an Access and Mobility Management Function (AMF), cause the AMF to:
   receive a first registration with a user equipment (UE) over a 3GPP access; and
   when the UE is also registered over a non-3GPP access and when a mobile-initiated connection only (MICO) mode is activated, the AMF will not send a notification message with an access type indicating the 3GPP access over the non-3GPP access for packet data unit (PDU) sessions associated with the 3GPP access.

2. The computer-readable non-transitory memory medium of claim 1, wherein the program instructions are further executable to cause the AMF to:
   deliver a downlink (DL) network access stratum (NAS) TRANSPORT message via the non-3GPP access when the UE is in the MICO mode and in a 5GMM-IDLE state for the 3GPP access.

3. The computer-readable non-transitory memory medium of claim 1, wherein the program instructions are further executable to cause the AMF to:
   when the UE is also registered over the non-3GPP access and the UE is not in a 5GMM-IDLE state for 3GPP access, select either the 3GPP access or the non-3GPP access for delivery of a downlink (DL) NAS TRANSPORT message when the UE is in the MICO mode.

4. The computer-readable non-transitory memory medium of claim 1, wherein the UE is an accessory device (AD).

5. The computer-readable non-transitory memory medium of claim 1,
   wherein the MICO mode is activated over the 3GPP access and a non-MICO mode is activated over the non-3GPP access.

6. The computer-readable non-transitory memory medium of claim 1, wherein the program instructions are further executable to cause the AMF to:
   accept device registration for the UE for the MICO mode with an all public land mobile network (PLMN) registration area allowed indication in a MICO indication information element (IE).

7. The computer-readable non-transitory memory medium of claim 1, wherein the program instructions are further executable to cause the AMF to:
   refrain from paging the UE when the MICO mode is activated.

8. An Access and Mobility Management Function (AMF), comprising:
   a non-transitory computer-readable memory medium; and
   a processor couple to the non-transitory computer-readable memory medium, wherein the AMF is configured to:
      receive a first registration with a user equipment (UE) over a 3GPP access; and
      when the UE is also registered over a non-3GPP access and when a mobile-initiated connection only (MICO) mode is activated, the AMF will not send a notification message with an access type indicating the 3GPP access over the non-3GPP access for packet data unit (PDU) sessions associated with the 3GPP access.

9. The AMF of claim 8, wherein the AMF is further configured to: deliver a downlink (DL) network access stratum (NAS) TRANSPORT message via non-3GPP access when the UE is in the MICO mode and in a 5GMM-IDLE state for the 3GPP access.

10. The AMF of claim 8, wherein AMF is further configured to:
    when the UE is also registered over the non-3GPP access and the UE is not in a 5GMM-IDLE state for 3GPP access, select either the 3GPP access or the non-3GPP access for delivery of a downlink (DL) NAS TRANSPORT message when the UE is in the MICO mode.

11. The AMF of claim 8,
    wherein the UE is an accessory device (AD).

12. The AMF of claim 8,
    wherein the MICO mode is activated over the 3GPP access and a non-MICO mode is activated over the non-3GPP access.

13. The AMF of claim 8, wherein AMF is further configured to:
    accept device registration for the UE for the MICO mode with an all public land mobile network (PLMN) registration area allowed indication in a MICO indication information element (IE).

14. The AMF of claim 8, wherein AMF is further configured to:
    refrain from paging the UE when the MICO mode is activated.

15. A method for operating an Access and Mobility Management Function (AMF), the method comprising:
    receiving a first registration with a user equipment (UE) over a 3GPP access; and
    when the UE is also registered over a non-3GPP access and when a mobile-initiated connection only (MICO) mode is activated, refrain from sending a notification message with an access type indicating the 3GPP access over the non-3GPP access for packet data unit (PDU) sessions associated with the 3GPP access.

16. The method of claim 15, the method further comprising:
    delivering a downlink (DL) network access stratum (NAS) TRANSPORT message via the non-3GPP access when the UE is in the MICO mode and in a 5GMM-IDLE state for the 3GPP access.

17. The method of claim 15, the method further comprising:
when the UE is also registered over the non-3GPP access and the UE is not in 5GMM-IDLE state for 3GPP access, selecting either the 3GPP access or the non-3GPP access for delivery of a downlink (DL) network access stratum (NAS) TRANSPORT message when the UE is in the MICO mode.

18. The method of claim 15,
wherein the MICO mode is activated over the 3GPP access and a non-MICO mode is activated over the non-3GPP access.

19. The method of claim 15, the method further comprising:
accepting device registration for the UE for the MICO mode with an all public land mobile network (PLMN) registration area allowed indication in a MICO indication information element (IE).

20. The method of claim 15, the method further comprising:
refraining from paging the UE when the MICO mode is activated.

\* \* \* \* \*